United States Patent [19]

Rust et al.

[11] 4,007,133

[45] Feb. 8, 1977

[54] PROCESS FOR THE MANUFACTURE OF A CATALYST

[75] Inventors: Kurt Rust, Frankfurt am Main; Erwin Schrott, Sulzbach, Taunus; Helmut Strametz, Frankfurt am Main, all of Germany

[73] Assignee: Hoechst Aktiengesellschaft, Frankfurt am Main, Germany

[22] Filed: Feb. 27, 1975

[21] Appl. No.: 553,813

[30] Foreign Application Priority Data

Mar. 20, 1974 Germany .......................... 2413261

[52] U.S. Cl. .......................... 252/429 B; 260/874; 526/90
[51] Int. Cl.² .......................................... C08F 4/66
[58] Field of Search ............................... 252/429 B

[56] References Cited

UNITED STATES PATENTS

| | | | |
|---|---|---|---|
| 2,914,515 | 11/1959 | Stuart | 252/429 B X |
| 3,029,231 | 4/1962 | van Amerongen | 252/429 B X |
| 3,058,970 | 10/1962 | Rust et al. | 252/429 B X |
| 3,394,118 | 7/1968 | Boor | 252/429 B X |
| 3,864,278 | 2/1975 | LaHeij et al. | 252/429 B |

*Primary Examiner*—Patrick P. Garvin
*Attorney, Agent, or Firm*—Curtis, Morris & Safford

[57] ABSTRACT

A catalyst of high activity and stereospecificity in α-olefin polymerization is obtained by subjecting titanium trichloride, obtained by reduction of titanium tetrachloride with aluminum alkyl halides, to two thermal treatments, the second thermal treatment being carried out in the presence of a dialkyl ether.

10 Claims, No Drawings

PROCESS FOR THE MANUFACTURE OF A CATALYST

The present invention relates to a process for the manufacture of a catalyst suitable for the polymerization of α-olefins.

In the polymerizaton of propylene or higher α-olefins with Ziegler type catalysts there are obtained, besides the technically very interesting highly crystalline polymers, which are insoluble or sparingly soluble in the hydrocarbons used as dispersion media under the polymerization conditions, also amorphous, readily soluble polymers, and oils. According to Natta, the highly crystalline polymers are sterically ordered and are called "isotactic," while the soluble polymers are sterically disordered and are called "atactic."

The formation of isotactic and amorphous poly-α-olefins is regulated by the catalyst system. For an economically useful process catalyst systems having a selective action are required, which lead exculsively or almost exclusively to the formation of the desired polymers.

A process has become known (British Pat. No. 895,595) according to which the selectivity of catalysts of the aforesaid type can be considerably improved with respect to the formation of polymers with high content of isotactic fraction by subjecting the reaction product of $TiCl_4$ and halogen-containing aluminum-organic compounds to a thermal treatment at a temperature in the range of from 40° to 150° C and after the treatment optionally washing the product several times with an inert solvent. This heat-treated and washed catalyst is then activated in the olefin polymerization with fresh diethyl aluminum monochloride. The efficiency of the heat-treated catalyst can be further improved by effecting the thermal treatment in the presence of complex forming compounds or compounds forming double salts, for example ethers and sodium chloride.

It is a primary object of this invention to provide a process for the manufacture of a catalyst suitable for olefin polymerization by reaction titanium tetrachloride in an inert hydrocarbon solvent with an aluminum-organic compound containing an aluminum dialkyl chloride, thermally treating the $TiCl_3$-containing reaction product in the presence of an ether, separating and washing the reaction product (component A) and mixing it with an aluminum dialkyl halide (component B) and optionally with a cyclopolyene (component C) as stereoregulator, which comprises adding the aluminum-organic compound containing aluminum dialkyl chloride to the $TiCl_4$ at a temperature of from −20° to +20° C in a molar proportion of aluminum dialkyl chloride to $TiCl_4$ of from 0.8 : 1 to 1.5 to 1, subjecting the $TiCl_3$-containing solid reaction product to a thermal treatment at a temperature of from 40° to 150° C, effecting a further thermal treatment in the presence of a dialkyl ether and separating the solid reaction product (component A).

The invention also relates to the catalyst prepared by the aforedescribed process and to its use in the polymerization of α-olefins.

To prepare the catalyst in accordance with the invention titanium tetrachloride is first reacted in inert hydrocarbon solvent with an aluminum-organic compound containing an aluminum dialkyl chloride.

The aluminum-organic compound containing an aluminum dialkyl chloride to be used is either an aluminum dialkyl chloride carrying alkyl groups with 1 to 6 carbon atoms, preferably aluminum diethyl chloride, dipropyl chloride, diisopropyl chloride, diisobutyl chloride, especially aluminum diethyl chloride, or an aluminum alkyl sesquichloride, i.e. an equimolecular mixture of aluminum dialkyl monochloride and aluminum alkyl dichloride, preferably aluminum ethyl sesquichloride, propyl sesquichloride, isopropyl sesquichloride or isobutyl sesquichloride, aluminum ethyl sesquichloride being particularly preferred.

In the reaction of titanium tetrachloride and the aluminum-organic compound containing an aluminum dialkyl chloride the molar proportion of aluminum dialkyl chloride to titanium tetrachloride is in the range of from 0.8 to 1.5 : 1, preferably 0.9 : 1 to 1.1 : 1. The aluminum compound is added to the dissolved titanium tetrachloride at a temperature of from −20° to +20° C, preferably 0° to 5° C.

As solvent an alkane or cycloalkane that is liquid at the reaction temperature is preferably used, for example hexane, heptane, octane, cyclohexane, or a hydrocarbon mixture, for example a gasoline fraction boiling in the range of from 130° to 170° C. Further suitable solvents are those which are used as dispersion medium in the polymerization of α-olefins. The amount of solvent is preferably chosen in such a manner that a 40 to 60 % by weight solution of titanium tetrachloride and a 15 to 25 % by weight solution of aluminum-organic compound are used. The same solvents are also used for the following reactions.

The $TiCl_3$-containing solid reaction product formed is separated from the reaction products which are soluble in the hydrocarbon, washed with the solvent and subjected to the first thermal treatment at a temperature of from 40° to 150° C, preferably 90° to 110° C, in the form of a suspension and while stirring. This first thermal treatment can likewise be effected prior to the separation of the reaction products soluble in the hydrocarbon, i.e. in their presence. In this case, the $TiCl_3$-containing reaction product is washed with the inert hydrocarbon after the first thermal treatment. It proved advantageous to carry out the first thermal treatment in several stages at different temperatures, for example in the first stage at 80° to 95° C and in the second stage at 100° to 110° C. The duration of the first thermal treatment depends on the temperature, i.e. it lasts longer at low temperature than at high temperature, the treatment times preferably being in the range of from 30 to 600 minutes. The thermally treated and washed reaction product containing solid $TiCl_3$ is suspended in an inert hydrocarbon and subjected to a further thermal treatment in the presence of a dialkyl ether and optionally a cyclopolyene.

If the solid reaction product had been separated from the mother liquor and washed, it is now again suspended in the solvent in an amount such that the concentration of titanium in the suspension is in the range of from 0.5 to 2.5 moles of $TiCl_3$, preferably 1.5 to 2.5 moles, per liter of solvent. The second thermal treatment is carried out at a temperature of from 70° to 150° C, preferably 80° to 120° C and especially 85° to 100° C. Suitable dialkyl ethers are those having from 2 to 5 carbon atoms in each alkyl group, for example diethyl ether, di-n-propyl ether, diisopropyl ether, di-n-butyl ether, diisobutyl ether, preferably di-n-butyl ether. The molar proportion of titanium trichloride to dialkyl ether in the thermal treatment is preferably in the range of from 1 : 0.6 to 1 : 1.2, more preferably 1 : 0.9 to 1 : 1.

The dialkyl ether is added to the suspension of the solid reaction product or vice versa. In the second heat treatment the dialkyl ether can be dissolved in a solvent, it is more advantageous, however, not to dilute it. The dialkyl ether is added to the solid suspension or the solid suspension to the dialkyl ether at the temperature of the second heat treatment over a period of a few seconds to 5 hours, preferably 1 to 30 minutes.

After mixing of the reaction components, the mixture is stirred for 5 to 300 and preferably 30 to 60 minutes at the temperature of this thermal treatment.

After the second thermal treatment the catalyst component A is thoroughly washed with a hydrocarbon solvent and optionally dried with the exclusion of air and humidity and then stored.

Component A is used together with an aluminum dialkyl halide (component B) and optionally a cyclopolyene (component C) for the polymerization of $\alpha$-olefins. $\alpha$-Olefins which can be polymerized with the catalyst of the invention are those of the formula $CH_2=CHR$ in which R stands for an alkyl radical having from 1 to 8 carbon atoms, preferably propylene, butene-1, pentene-1, 3-methylbutene-1, 4-methyl-pentene-1 and 3-methyl-pentene-1, propylene being preferred. The catalyst according to the invention can be used for the homopolymerization as well as for the copolymerization of mixtures of the aforesaid olefins with one another and/or with ethylene. In the copolymerization the mixture contains at least 95 % by weight of one of the $\alpha$-olefins and at most 5 % by weight of ethylene, each time calculated on the total amount of monomers. The catalyst is especially favorable for the polymerization of mixtures of propylene with small amounts of ethylene of from 0.5 to 5 and preferably 1.5 to 3 % by weight. The catalyst of the invention can also be used for the block polymerization of the said $\alpha$-olefins with one another and/or with ethylene. In this case the content of ethylene is below 25 % by weight. Block polymers of propylene and ehtylene are preferably made. The block polymers made with the catalyst of the invention are characterized by a high hardness and an excellent impact strength at a temperature below 0° C.

The polymerization is carried out continuously or discontinuously in suspension or in the gaseous phase at a pressure of from 1 to 50 kg/cm², preferably 1 to 40 kg/cm².

The suspension polymerization is carried out in an inert solvent, for example a petroleum fraction poor in olefins and having a boiling point in the range of from 60° to 250° C which must be carefully freed from oxygen, sulfur compounds and humidity, or saturated aliphatic and cycloaliphatic hydrocarbons such as butane, pentane, hexane, heptane, cyclohexane, methylcyclohexane, or aromatic compounds such as benzene, toluene, and xylene. The suspension polymerization can advantageously be carried out also in the $\alpha$-olefin to be polymerized, for example liquid propylene, as dispersion medium.

It is likewise possible to carry out the polymerization in the absence of a solvent in the gaseous phase, for example in a fluidized bed.

If necessary, the molecular weight of the polymer is regulated by adding hydrogen.

The amount of catalyst component A depends on the intended reaction conditions, especially temperature and pressure. In general, 0.05 to 10 mmoles of $TiCl_3$ and preferably 0.1 to 3 mmoles, are used per liter of solvent in the suspension polymerization or per liter of reactor volume in the gase phase polymerization.

Catalyst component B is an aluminum dialkyl monochloride of the formula $AlR_2Cl$ in which R is an aliphatic hydrocarbon radical having up to 8 carbon atoms, preferably aluminum diethyl monochloride. The amount of component B is chosen in such a manner that the molar proportion of component B to component A (calculated on $TiCl_3$) is in the range of from 0.5 : 1 to 100 : 1, preferably 1 : 1 to 10 : 1.

The catalyst consisting of components A and B has a high polymerization activity and a good stereospecificity which largely depends on the polymerization temperature. When, for example, propylene is polymerized at 60° C the dispersion medium contains less than 3.5 % by weight of soluble fractions, calculated on the toal polymer, preferably less than 2.5 % by weight. At a polymerization temperature of 70° to 80° C the undesired soluble fraction increases up to 6 % by weight. On the other hand, a higher polymerization temperature is desirably with respect to the dissipation of the polymerization heat.

It is known that with increasing pressure and, hence, at a higher polymerization rate, the amount of soluble fractions increases. When, for example, propylene is polymerized in liquid propylen under about 32 kg/cm² and at 70° C, 7 to 8 % of soluble fractions are obtained.

The good stereospecificity of the catalyst at higher polymerization pressure and temperature can be further improved by using a cyclopolyene as catalyst component C, for example cycloheptatriene-1,3,5 and/or norcaradiene, as well as the alkyl- or alkoxy-substituted derivatives thereof, preferably cycloheptatriene-1,3,5 itself. Component C is added to component A suitably together with component B at the beginning of polymerization. The molar proportion of component C to component A, calculated as $TiCl_3$, is in the range of from 0.1 : 1 to 1 : 1, preferably 0.2 : 1 to 0.6 : 1.

The polymerization in the presence of the catalyst of the invention is carried out at a temperature of from 20° to 120° C, preferaby 50° to 90° C. Higher temperatures are also possible but in this case a higher fraction of soluble atactic polymer is formed.

By the thermal treatment according to the invention in several stages of a titanium chloride-containing reduced solid with the last stage of the thermal treatment being carried out in the presence of a dialkyl ether, preferably di-n-butyl ether, a catalyst component (A) is obtained which, already in combination with an aluminum dialkyl halide as activator (component B), considerably increases the polymerization rate of $\alpha$-olefins with improved stereospecificity. As compared to the state of the art as disclosed in British Specification No. 895,595, the catalyst activity is over 100 % higher at the same polymerization temperature and pressure with an equally good stereospecificity. Owing to the higher catalyst activity (g polymer per g catalyst) the same space-time-yield can be obtained with a smaller amount of catalyst, whereby the further processing of the polymer is considerably facilitated or a processing under like conditions ensures a more efficient removal of the catalyst. When the polymerization is carried out under elevated pressure, for example above 20 kg/cm², either in the gaseous phase or in liquid $\alpha$-olefin, for example liquid propylene, the yields obtained are so high that a catalyst removal can be dispensed with (more than 1,000 g polymer per millimole $TiCl_3$).

The following examples illustrate the invention.

EXAMPLES 1 – 3

A. Preparation of catalyst

A 1. Reduction of $TiCl_4$ by using aluminum ethyl sesquichloride

With the exclusion of air and moisture a 10 liter vessel with stirrer was charged with 1,090 ml of a hydrogenated, oxygen-free gasoline fraction boiling at 140°–165° C and 550 ml of titanium tetrachloride (5 moles) and at 0° C, while stirring under nitrogen, (250 rev/min) a solution of 1111.2 g of aluminum ethyl sesquichloride containing 4.5 moles aluminum diethyl monochloride in 3334 g of the gasoline fraction was dropped in over a period of 8 hours. A red-brown fine precipitate separated. The mixture was stirred for another 2 hours at 0° C and then for 12 hours at room temperature.

The suspension was heated for 4 hours to 90° C and for another 6 hours to 110° C. The separated precipitate was allowed to settle and the supernatant mother liquor was separated by decantation and washed five times, each time with 2,000 ml of the gasoline fraction. The washed solid reaction product was suspended again in the gasoline fraction and the concentration of the suspension was adjusted to 2 moles $TiCl_3$/liter. The content of trivalent titanium in the suspension was determined by titration with a Ce-IV solution.

A 2. Second thermal treatment in the presence of di-n-butyl ether 500 ml of the 2-molar suspension (corresponding to 1 mole $TiCl_3$) were heated to 85° C in a 2 liter vessel with stirrer, with the exclusion of air and humidity and under nitrogen and at said temperature 161 ml di-n-butyl ether (0.95 mole) were dropped in while stirring over a period of 30 minutes. The suspension was kept at 85° C for one hour. On adding the ether the mother liquor turned olive green. The treated catalyst component A was then washed five times, each time with 500 ml of the gasoline fraction.

B. Polymerization of propylene

A 1 liter glass autoclave was charged, with the exclusion of air and humidity, with 0.5 liter of the aforesaid hydrogenated gasoline fraction (b.p. 140°– 165° C) and the gasoline was saturated with propylene at 55° C. The amounts of $Al(C_2H_5)_2Cl$ (activator, component B) indicated in the following Table 1 were added and then component A, i.e. thermally treated solid reaction product according to A 2(Examples 1 and 2) and solid reaction product according to A 1, (comparative Example 3), respectively, is added, each time in an amount corresponding to 1 mmole $TiCl_3$. 0.25 kg/cm² hydrogen was forced in and over a period of 5 minutes propylene was introduced in an amount such that a pressure of 6 kg/cm² was obtained. During the course of polymerization this pressure was maintained by adding propylene. After a time of polymerization of 2 hours the pressure in the autoclave was released and the polymer suspension was filtered off with suction, the polymer on the filter was washed with 1 liter of hot solvent (70° C) and dried at 70° C under reduced pressure.

To determine the soluble fraction formed in the polymerization (atactic polypropylene) the mother liquor of the polymer suspension and the wash solutions were combined and evaporated to dryness under reduced pressure. The polymerization results are listed in the following Table 1.

EXAMPLE 4 (Comparative Example)

A. Preparation of catalyst $TiCl_4$ was reduced with aluminum ethyl sesquichloride under the conditions specified in Example 1, (A 1), but after the reaction the precipitate was not subjected to a thermal treatment, it was only washed, suspended and the suspension was adjusted to a concentration of 2 moles $TiCl_3$/l. 500 ml of the 2-molar suspension (corresponding to 1 mole $TiCl_3$) were heated to 85° C and at said temperature 161 ml di-n-butyl ether (0.95 mole) were dropped in while stirring over a period of 30 minutes. The suspension was maintained at 85° C for 1 hour. On adding the ether the mother liquor turned olive green.

The solid reaction product was washed five times, each time with 1,000 ml of the gasoline fraction.

B. Polymerization of propylene under pressure

The polymerization with the catalyst component A obtained as described (sub A) was carried out under the conditions of Example 1(B). The result is listed in the following Table 1.

EXAMPLE 5

Polymerization of propylene in liquid monomer

A 16 liter enamelled vessel provided with stirrer, jacket heating and gas inlet was flushed at room temperature with pure nitrogen and then with propylene. A pressure of 0.5 kg/cm² of hydrogen was built up and through a valve a solution of 32 mmoles $Al(C_2H_5)_2Cl$ in 6 liters of liquid propylene and a suspension of the catalyst component A (4 mmoles $TiCl_3$) according to Example 1 A in 6 liters of liquid propylene were added. The vessel was heated to 70° C whereby the pressure rose to about 32 kg/cm². The internal temperature was maintained at 70° C by cooling. Polymerization started after a few minutes and was interrupted after 6 hours by pressure release. After drying 5.5 kg of a freely flowing polymer having an apparent density of 520 g/l were obtained. The reduced specific viscosity (RSV) was 2.6 dl/g. By a 16 hour extraction with heptane a soluble fraction of 6.5 % by weight was found. The ball indentation hardness according to DIN 53 456 was 670 kg/cm².

EXAMPLE 6

Polymerization of 4-methylpentene-1

A 2 liter vessel with stirrer, thermometer and gas inlet was charged, with the exclusion of air and humidity, with 1 l of hydrogenated, oxygen-free gasoline fraction (b.p. 140°–165° C) and scavenged with pure nitrogen. At 50° C 8 mmoles of aluminum diethyl monochloride (0.97 ml) and an amount of catalyst component A prepared according to Example 1 A corresponding to 5 mmoles of $TiCl_3$ were added. During the course of 3 hours 200 g of 4-methyl-pentene-1 were added dropwise. The polymerization temperature was maintained at 55° C. Polymerization started after a few minutes and the polymer separated in the form of a fine precipitate. When the dropwise addition was terminated the polymerization mixture was stirred for another 2 hours at 55° C and the polymerization was interrupted by adding 50 ml of isopropanol, the mixture was stirred for 1 hour at 60° C, extracted with warm water and filtered off with suction while still hot.

After thorough washing with hot solvent (gasoline) and acetone and drying under reduced pressure at 70° C, 190 g of colorless poly-4-methylpentene-1-were obtained, having an apparent density of 520 g/l. The mother liquor was found to contain a very small soluble fraction of 0.3 %.

EXAMPLES 7 – 12

A. Catalyst component A was prepared as described in Example 1 A.

B. Polymerization of propylene

A 1 liter glass autoclave was charged, with the exculsion of air and humidity, with 0.5 l of a hydrogentaed gasoline fraction (b.p. 140°–165° C) and saturated with propylene at 55° C. The amounts of Al($C_2H_5$)$_2$Cl (activator, component B), freshly distilled cycloheptatriene-1,3,5 (component C) and then the above specified catalyst component A (each time 1 mmole TiCl$_3$) were added, 0.25 kg/cm$^2$ of hydrogen was forced in and within 5 minutes propylene was introduced in an amount to build up a pressure of 6 kg/cm$^2$. This pressure was maintained during the course of polymerization by adding propylene. After a time of polymerization of 2 hours the pressure in the autoclave was released and the polymer suspension was filtered off with suction, the polymer was washed on the filter with 1 l of hot solvent (70° C) and dried under reduced pressure at 70° C.

At a polymerization temperature above 60° C (cf. Table 2) the mixture was first polymerized for 10 minutes a 60° C whereupon the temperature was raised to the higher level.

EXAMPLE 13

Polymerizaton of propylene in liquid monomer

A 16 l enamelled vessel provided with stirrer, jacket heating and gas inlet was flushed at room temperature with pure nitrogen and then with propylene. A pressure of 0.5 kg/cm$^2$ of hydrogen was built up and through a valve a solution of 32 mmoles Al($C_2H_5$)$_2$Cl in 6 l of liquid propylene, a suspension of the catalyst component A of Example 1 A (4mmoles TiCl$_3$) and 1.6 ml of a 1-molar solution of cycloheptatriene-1,3,5 (component C) in hexane (1.6 mmoles) and finally 6 l of liquid propylene were added. The polymerization mixture was heated to 70° C whereby the pressure rose to about 32 kg/cm$^2$. The internal temperature was maintained at 70° C by cooling. The polymerization started after a few minutes. The experiment was interrupted after 6 hours by releasing the pressure. After drying 5.8 kg of a freely flowing polymer having an apparent density of 550 g/l and an RSV value of 2.7 dl/g were obtained. By 16 hour extraction with heptane a soluble fraction of 2.8 % by weight was found. The ball indentation hardness of the polymer was 820 kg/cm$^2$ (DIN 53 456).

When the polymerizaton was carried out under identical conditions but with a catalyst which did not contain component C, the polypropylene contained a soluble fraction of 6.5 % (cf. Example 5).

Table 1

$C_3H_6$ polymerization under 6 kg/cm$^2$ in the presence of 0.25 kg/cm$^2$ hydrogen; 1 mmole TiCl$_3$, polymerization temperature 60° C, polymerization period 2 hours

| Example | component A according to | amount Al($C_2H_5$)$_2$Cl (component B) in mmoles | yield g | apparent density g/l | soluble fraction % by weight, calculated on total polymer | RSV dl/g[+] |
|---|---|---|---|---|---|---|
| 1 | A 2 | 10 | 197 | 510 | 1.15 | 2.8 |
| 2 | A 2 | 5 | 184 | 500 | 2.0 | 3.2 |
| 3 | A 1 (comparative Example A) | 10 | 95 | 480 | 2.2 | 2.9 |
| 4 | 4 A (comparative Example B) | 10 | 180 | 450 | 10 | 2.7 |

[+]) measured in a 0.1% decahydronapthalene solution at 135° C

Table 2

$C_3H_6$ polymerization under 6 kg/cm$^2$ in the presence of 0.25 kg/cm$^2$ hydrogen; 1 mmole TiCl$_3$, polymerization period 2 hours

| Example | amount Al($C_2H_5$)$_2$Cl (component B) in mmoles | amount cycloheptatriene (component C) in mmoles | molar proportion C:TiCl$_3$ | polymerization temperature ° C | yield g | apparent density g/l | soluble fraction % by weight calculated on total polymer | RSV dl/g [+]) |
|---|---|---|---|---|---|---|---|---|
| 7 | 10 | 0.2 | 0.2 | 60 | 190 | 520 | 0.8 | 2.9 |
| 8 | 10 | 0.3 | 0.3 | 60 | 180 | 515 | 0.6 | 2.7 |
| Comparative Example (= Example 1) | 10 | — | — | 60 | 197 | 510 | 1.15 | 2.8 |
| 9 | 10 | 0.2 | 0.2 | 80 | 226 | 504 | 1.4 | 2.3 |
| 10 | 10 | 0.3 | 0.3 | 80 | 224 | 508 | 1.2 | 2.1 |
| 11 | 10 | 0.4 | 0.4 | 80 | 225 | 514 | 1.03 | 2.2 |
| Comparative Example C | 10 | — | — | 80 | 234 | 501 | 6 | 2.4 |

[+]) measured in 0.1% solution in decahydronaphthalene at 135° C

What is claimed is:

1. In the process for the manufacture of a catalyst by reacting titanium tetrachloride in an inert hydrocarbon solvent with an aluminum-organic compound selected from the group consisting of aluminum dialkyl chlorides and aluminum alkyl sesquichlorides wherein the alkyl group contains 1 to 6 carbon atoms, thermally treating the TiCl$_3$-containing reaction product, separating and washing the reaction product (component A) and mixing it with an aluminum dialkyl halide (component B) the improvement which comprises preparing component A by adding said aluminum-organic compound to the TiCl$_4$ at a temperature of from 31 20° to +20° C in a molar proportion of aluminum dialkyl chloride to TiCl$_4$ of from 0.8:1 to 1.5:1, subjecting the TiCl$_3$-containing solid reaction product to a thermal treatment at a temperature of from 40° to 150° C, effecting a further thermal treatment at a temperature of 70° to 150° C in the presence of a dialkyl ether at a TiCl$_3$-ether molar ratio of 1:0.6 to 1:1.2 and separating the solid reaction product.

2. A process as claimed in claim 1, wherein aluminum ethyl sesquichloride is used for the reaction with titanium tetrachloride.

3. A process as claimed in claim 1, wherein at the beginning of the reaction of titanium tetrachloride with the aluminum-organic compound the molar proportion of aluminum dialkyl chloride to titanium tetrachloride is in the range of from 0.9 : 1 to 1.1 : 1.

4. A process as claimed in claim 1, wherein the first thermal treatment of the TiCl$_3$-containing reaction product is carried out at a temperature of from 40° to 150° C in several temperature stages.

5. A process as claimed in claim 1, wherein the thermal treatment in the presence of a dialkyl ether lasts for 5 to 300 minutes.

6. A process as claimed in claim 1, wherein the suspension subjected to the thermal treatment in the presence of the dialkyl ether contains 0.5 to 2.5 moles TiCl$_3$ per liter.

7. A process as claimed in claim 1, wherein di-n-butyl ether is used for the thermal treatment.

8. A process as claimed in claim 1, wherein the molar proportion of aluminum dialkyl monochloride (component B) to component A is in the range of from 1 : 1 to 100 : 1.

9. A process as claimed in claim 1, wherein there is incorporated in the catalyst a component C which is a cyclopolyene selected from the group consisting of cycloheptatriene-1,3,5, norcaradiene and the alkyl- and alkoxy-substituted derivatives thereof having 1 to 4 carbon atoms in the alkyl radical and the molar proportion of component C to component A is in the range of from 0.1 : 1 to 1 : 1.

10. A catalyst prepared by the process of claim 1.

* * * * *